US010839331B1

(12) United States Patent
Price et al.

(10) Patent No.: US 10,839,331 B1
(45) Date of Patent: *Nov. 17, 2020

(54) AGENCY BUSINESS PLANNING TOOL

(71) Applicant: Allstate Insurance Company, Northbrook, IL (US)

(72) Inventors: Mark Price, Chicago, IL (US); Dennis Zic, Wood Dale, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/427,660

(22) Filed: May 31, 2019

Related U.S. Application Data

(63) Continuation of application No. 14/017,714, filed on Sep. 4, 2013, now Pat. No. 10,339,486.

(51) Int. Cl.
*G06Q 10/06* (2012.01)

(52) U.S. Cl.
CPC .............................. *G06Q 10/06393* (2013.01)

(58) Field of Classification Search
CPC ....................................................... G06Q 10/06
See application file for complete search history.

(56) References Cited

U.S. PATENT DOCUMENTS

| | | | |
|---|---|---|---|
| 4,831,526 A | 5/1989 | Luchs et al. | |
| 5,956,691 A | 9/1999 | Powers | |
| 6,684,189 B1 | 1/2004 | Ryan et al. | |
| 7,480,624 B2 | 1/2009 | Roman et al. | |
| 7,877,269 B2 | 1/2011 | Bauer et al. | |
| 8,271,326 B1 | 9/2012 | Brunet et al. | |
| 8,290,797 B2 | 10/2012 | Hargroder | |
| 8,340,983 B2 | 12/2012 | Grover et al. | |
| 8,407,073 B2 | 3/2013 | Bagheri et al. | |
| 2002/0142274 A1 | 10/2002 | Fujino | |
| 2002/0184163 A1* | 12/2002 | Lotter | G06Q 20/3674 705/67 |
| 2003/0033192 A1 | 2/2003 | Zyman et al. | |
| 2003/0208388 A1 | 11/2003 | Farkas et al. | |
| 2004/0122936 A1 | 6/2004 | Mizelle et al. | |

(Continued)

FOREIGN PATENT DOCUMENTS

WO  2001008074 A2  2/2001

OTHER PUBLICATIONS

"Business Intelligence and Insurance", MicroStrategy Incorporated, 2007.

(Continued)

*Primary Examiner* — Kurtis Gills
(74) *Attorney, Agent, or Firm* — Banner & Witcoff, Ltd.

(57) ABSTRACT

Methods and apparatuses allow an insurance agency to track their current performance in managing existing customers and bringing in new customers. A tool may obtain information from a user regarding characteristics of the user's agency and/or agency goals. The tool may use this information to determine an agency's business efficiency. The tool may also provide advice regarding marketing spending and/or additional human resources needed. The tool may benchmark an insurance agency against other agencies in the market. The tool may also display how generated leads are converted to new business and/or income for an agency.

20 Claims, 15 Drawing Sheets

(56) References Cited

U.S. PATENT DOCUMENTS

| | | | |
|---|---|---|---|
| 2004/0143473 A1* | 7/2004 | Tivey | G06Q 10/063112 705/1.1 |
| 2006/0064313 A1* | 3/2006 | Steinbarth | G06Q 10/10 705/322 |
| 2006/0080229 A1* | 4/2006 | Masella | G06Q 40/02 705/38 |
| 2006/0085255 A1 | 4/2006 | Hastings et al. | |
| 2006/0100912 A1 | 5/2006 | Kumar et al. | |
| 2008/0208651 A1* | 8/2008 | Johnston | G06Q 10/06311 705/7.13 |
| 2009/0010410 A1* | 1/2009 | Anderson | G06O 30/08 379/201.01 |
| 2009/0192867 A1 | 7/2009 | Farooq et al. | |
| 2010/0094871 A1 | 4/2010 | Ruggieri et al. | |
| 2010/0100398 A1 | 4/2010 | Auker et al. | |
| 2010/0169128 A1 | 7/2010 | Berlin et al. | |
| 2011/0022416 A1 | 1/2011 | Bergquist et al. | |
| 2012/0166359 A1 | 6/2012 | Sexauer et al. | |
| 2012/0303393 A1 | 11/2012 | Schiminovich | |
| 2013/0211963 A1* | 8/2013 | Williams | G06Q 30/04 705/26.43 |
| 2014/0046723 A1* | 2/2014 | Clark | G06Q 30/0201 705/7.29 |

OTHER PUBLICATIONS

"Product Features—InsurancePro", ITC Insurance Technologies Corporation, downloaded from <www.getitc.com/products/management/features.aspx> on May 15, 2013.

"Powerful benefit management and procurement solution that fits your business", Vertafore, Inc, downloaded from <www.vertafore.com/All-Products/BenefitPoint> on May 15, 2013.

"AMS360 Insurance Agency Management System", Insurance Agency Management System, Vertafore, Inc., downloaded from <www.vertafore.com/All-Products/AMS360> on May 15, 2013.

"Benchmarking Software Development Productivity", IEEE Software, Jan./Feb. 2000, pp. 80-88.

"Applied TAM Agency Management System", Applied Systems, downloaded from <https://www1.appliedsystems.com/en-us/solutions/for-agents/agency-management-system/applied-tam> on Aug. 30, 2018.

"Applied Epic", Applied Systems, downloaded from <https://www1.appliedsystems.com/en-us/solutions/for-agents/agency-management-system/applied-epic> on Aug. 30, 2018.

"Best Insurance Agency Software", Capterra, downloaded from <https://www.capterra.com/insurance-agency-software/> on Aug. 30, 2018.

"Insurance CRM", AllClients LLC, downloaded from <https://www.allclients.com/Insurance-CRM.aspx> on Aug. 30, 2018.

"Welcome to aspire", Impowersoft, Inc, downloaded from <http://www.impowersoft.com/aspire/index.htm> on Aug. 30, 2018.

"Best Insurance CRM", Software Advice, Inc., downloaded from <https://www.softwareadvice.com/crm/insurance-crm-compairson/> on Aug. 30, 2018.

\* cited by examiner

Foundational Questions

1. When did you become an agent at this agency?

2. In what manner did you start your agency?
   ○ Scratch start-up    ● Acquired an existing book    ○ Merged with an existing book 3. What is your ultimate goal in owning an agency?

4. How much income (gross) will it take to achieve this goal?

5. What is your time horizon in achieving this goal?

6. What types of processes do you have in place to generate leads from your existing book of business?

7. What types of processes do you have in place to generate leads from your previous leads that you failed to quote?

During the course of a typical business day, how much time (in hours) do you spend doing the following tasks?

| Agency Owner Tasks | Time |
|---|---|
| Prospecting, both for new customers and new business with existing customers | |
| Providing customer protection reviews | |
| Directing incoming phone calls to the appropriate source | |
| Developing tasks and plans for employees | |
| Ensuring that employee tasks and targets are being met | |
| Letting customers know about upcoming changes to rates or coverages | |
| Sorting through available leads from various sources and planning follow-ups | |
| Reaching out to customers with a newly opened/closed claim | |
| Handling walk-in payments | |
| Contacting late paying or cancelled customers | |
| Scanning, faxing, copying, and storing customer documents | |
| Managing and maintaining the office space and supplies | |
| Identifying potential customer markets and developing marketing plans | |
| Welcoming new customers to this agency | |
| Processing bound policies | |
| Total | 8.0 |

301

| Agency Owner Time Allocation | |
|---|---|
| Acquisition | 19% |
| Retention | 25% |
| Administrative | 0% |
| Business Management | 56% |

302

Next Step

| | Metric | | Suggested Source | Agent Data |
|---|---|---|---|---|
| 311 Agent Resource Commitment | % of Day Spent on Acquisition | 317 | Agent | 319 19% |
| | % of Day Spent on Retention | | 318 Agent | 25% |
| | % of Day Spent on Administrative Tasks | | Agent | 0% |
| | % of Day Spent Managing Business | | Agent | 56% |
| 312 Book Descriptors | Total Proprietary P&C PIF, Prior Year End | | CSRP | |
| | Total Proprietary P&C PIF, Current Year | | CSRP | |
| | Total Proprietary P&C IIF, Current Year | | CSRP | |
| | Total Casualty IIF/PIF Ratio | | | 1.42 |
| | Average Annual Premium per IIF | | | $975.54 |
| | YTD Written Premium- Total | | CSRP | |
| | Month From "As of Date" on CSRP Report | | | |
| | Total Annualized Written Premium | | | $4,518,722 |
| | Total Retention- Current | | CSRP | |
| | Tenure Retention- % 1st Year | | CSRP | |
| | Households Served | | CSRP | |
| | PIF/Household Ratio | | | 1.7 |
| 313 Product Offering | Brokered Products | | Agent | |
| | Agency Financial | | Agent | |
| 314 Compensation | Expected Commission Rate (9% - 11%) | | | |
| | Current Bonus (% WP) (0% - 4%) | | Agency Bonus Forecasting Tool | |
| | PYE Bonus ($) | | | |
| | Agency Technology Allowance | | | $1,750 |
| | Executive Advantage | | January Comp Statement | |
| | Other Compensation | | | $2,000 |
| | Agency Financial | | | |
| | Brokered Commissions | | Agent | |
| | Other Compensation 2 | | Agent | |
| 315 Staffing | # of CSRs | | Staff tab | 2.00 |
| | Monthly Capacity (Households) | | Agent | |
| | # of Producers | | Staff tab | 1.00 |
| | Monthly Capacity (Leads) | | Agent | |
| | # of Admins/Telemarketers | | Staff tab | 0.00 |
| | Productivity Boost Provided to LSP by 1 full time Telemarketer | | Agent | |
| | Current Staffing Expense | | Staff tab | $98,767 |
| | Current Market CSR Salary & Benefits (Per FTE) | | FSL | |
| | Current Market Producer Salary & Benefits (Per FTE) | | FSL | |
| | Current Market Administrative Support Salary & Benefit (Per FTE) | | FSL | |
| 316 Expenses | Marketing Spend | | | $29,900 |
| | Acquisition Campaigns | | Agent | |
| | Retention Campaign | | Agent | |
| | Operating Expenses x Marketing x Retention | | Operating Exp. tab | $31,740 |
| | Debt Service Expense | | Agent | $162,000 |
| | Annual Payment on Note #1 | | Agent | |
| | Remaining Term on Note #1 | | Agent | |
| | Annual Payment on Note #2 | | Agent | |
| | Remaining Term on Note #2 | | Agent | |
| | Annual Payment on Note #3 | | Agent | |
| | Remaining Term on Note #3 | | Agent | |

Next Step 320

Total Annual Staffing Expense

Agency Location:

| Staff Name | Annual Wages | Taxes | Annual Benefits | Total Annual Cost | % of Time (Assumes Full-time Employee) | | |
|---|---|---|---|---|---|---|---|
| | | | | | Production | Retention | Administrative | Total |
| 1 | | $3,501 | | $37,501 | | | | 100% |
| 2 | | $3,004 | | $30,504 | | | | 100% |
| 3 | | $2,430 | | $22,430 | | | | 100% |
| 4 | | $1,332 | | $8,332 | | | | 25% |
| 5 | | $0 | | $0 | | | | 0% |
| 6 | | $0 | | $0 | | | | 0% |
| 7 | | $0 | | $0 | | | | 0% |
| 8 | | $0 | | $0 | | | | 0% |
| 9 | | $0 | | $0 | | | | 0% |
| 10 | | $0 | | $0 | | | | 0% |
| Total | | | | $98,767 | 1.0 | 2 | 0.3 | |

330

335 — Next Step

Use this worksheet to enter non-staff expenses- expenses that are incurred to keep the agency office location open for business. Enter an estimate of the amount of MONTHLY expense.

| Operating Expenses | Est. *MONTHLY* Amounts |
|---|---|
| Office | |
|    Rent | |
|    Maintenance *(incl CAM)* | |
|    Phone Service/ Data Plan | |
|    Utilities | |
|    Supplies | |
|    Office Equipment | |
| Computer | |
|    Hardware | |
|    Software | |
|    Maintenance | |
|    Support | |
|    Supplies | |
| Insurance | |
|    Errors & Ommissions | |
|    Key Person | |
|    Office | |
| Professional Services | |
| Company Car | |
| All Other | |
|    Licenses & Permits | |
|    Education | |
|    Dues & Subscriptions | |
|    Other | |
|    Traveling and Entertainment | |
|    Misc 1 | |
|    Misc 2 | |
| | MONTHLY / ANNUAL |
| TOTAL OPERATING EXPENSES | $2,835 / $34,020 |

340

Next Step

| Projected Monthly Spend: | $2,325 | | | | | | |
|---|---|---|---|---|---|---|---|
| Unallocated Month Spend: | $0 | | | | | | |
| Externally Generated Leads | | | | | | | |
| Source | Monthly Spend | Leads Generated | Potential Quotes Per Lead | Cost per Lead | Quote Ratio (Serious Quotes per Lead) | Quotes | Cost per Quote |
| *Example: Telemarketing Svc* | *$1,000* | *150* | *1.5* | *$6.67* | *40%* | *90* | *$11.11* |
| Telemarketing Service | | | | $0.00 | | 0 | $0.00 |
| Internet | | | | $3.70 | | 54 | $18.52 |
| Direct Mail | | | | $50.00 | | 12 | $83.33 |
| Regional Marketing Package | | | | $0.00 | | 0 | $0.00 |
| Misc. | | | | $0.00 | | 0 | $0.00 |
| Quote Generating Call Service | | | | $2.50 | | 12 | $10.42 |
| Other Marketing Source | | | | $0.00 | | 16 | $12.50 |
| Input Quote Source | | | | $0.00 | | 0 | $0.00 |
| Input Quote Source | | | | $0.00 | | 0 | $0.00 |
| Internally Generated Leads/ Agency Generated Leads | | | | | | | |
| Source | Monthly Spend | Leads Generated | Potential Quotes Per Lead | Cost per Lead | Quote Ratio (Serious Quotes per Lead) | Quotes | Cost per Quote |
| *Example: Cross-Sell* | *$0* | *10* | *2* | *$0.00* | *50%* | *10* | *$0.00* |
| Campaign #1 | $0 | | | $0.00 | | 0 | $0.00 |
| Campaign #2 | $0 | | | $0.00 | | 0 | $0.00 |
| Campaign #3 | $0 | | | $0.00 | | 0 | $0.00 |
| Campaign #1 | $0 | | | $0.00 | | 0 | $0.00 |
| Campaign #2 | $0 | | | $0.00 | | 0 | $0.00 |
| Campaign #3 | $0 | | | $0.00 | | 0 | $0.00 |
| Cross-sell | | | | $0.00 | | 2 | $0.00 |
| Process #1 | | | | $0.00 | | 0 | $0.00 |
| Process #2 | | | | $0.00 | | 0 | $0.00 |
| Referrals | | | | $0.00 | | 3 | $0.00 |
| Quote-Request | | | | $0.00 | | 0 | $0.00 |
| Process #2 | | | | $0.00 | | | |
| TOTAL | $2,325 | 365 | | $6.84 | 27% | 99 | $23.53 |
| Annual Spend | $27,900 | | | | | | Close Ratio |

NOTES: Serious Quotes are quotes in which consumer credit / MMR is run.

"FSC" can work with Regional Marketing Manager to identify the relevant campaigns and the impact for agency owners: RMM can also identify amount spent on marketing packages, and the leads generated. Agency Owner can also track Agency Generated Leads through My Work Items.

350

355

Next Step

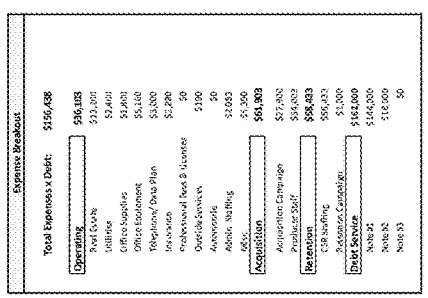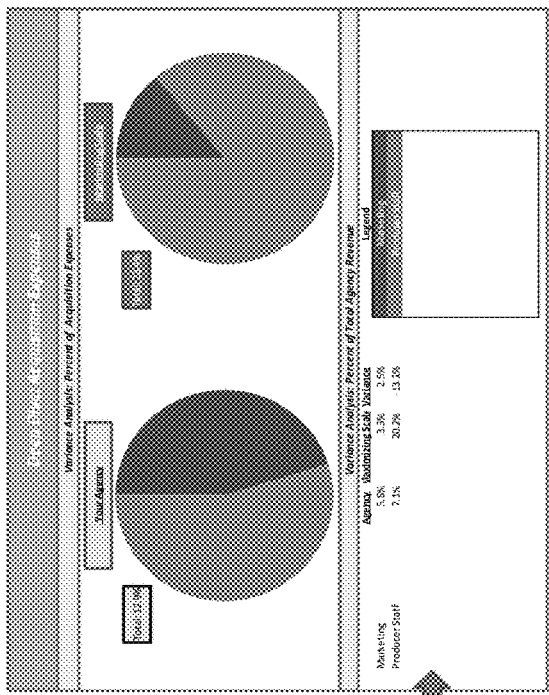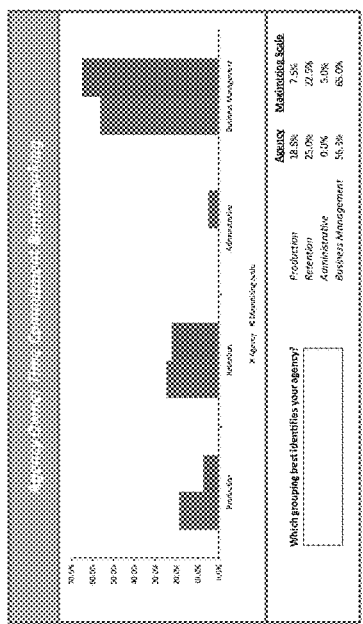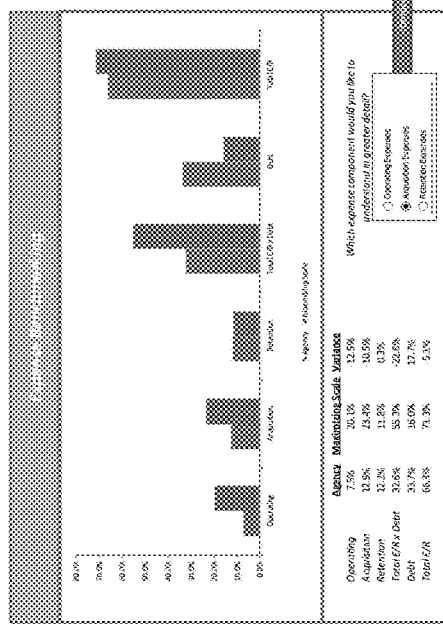
FIGURE 3g

| | Potential Opportunity Areas | Agency Status | Tab Reference | Additional Notes |
|---|---|---|---|---|
| Key Agency Metrics | Agent Resource Commitment (Absolute Variance to Benchmark) | | | |
| | Production | 27.5 | Key Agency Metrics | Agent's activities align with optimal allocation |
| | Retention | 11.3 | Key Agency Metrics | Resource commitment varies from optimal allocation |
| | Administration | 2.5 | Key Agency Metrics | Resource commitment is in line with optimal allocation |
| | Business Management | 5.0 | Key Agency Metrics | Resource commitment is in line with optimal allocation |
| | | 8.8 | Key Agency Metrics | Resource commitment varies from optimal allocation |
| | Expense Ratio (x Debt) (Variance to Benchmark) | 22.8 | Key Agency Metrics | Agency costs appear to deviate from nationwide average |
| | Operating Expense Ratio | 12.5 | Key Agency Metrics | Expense ratio appears to significantly deviate from nationwide average |
| | Acquisition Expense Ratio | 10.5 | Key Agency Metrics | Expense ratio appears to significantly deviate from nationwide average |
| | Retention Expense Ratio | 8.3 | Key Agency Metrics | Expense ratio appears to align with nationwide average |
| Acquisition | Cost Per serious Quote | $36.17 | 1 Acquisition Funnel | Cost per quote significantly deviates from the nationwide average |
| | Lead Utilization | 65.5% | 1 Acquisition Funnel | Producers lack the capacity to work a significant number of the leads being generated |
| Staffing | LSP Utilization | 100.0% | 1 Acquisition Funnel | Producer capacity is currently adequate, but a change in current conditions (i.e. increased marketing spend, drop in producer capacity) would result in under-utilization of leads |
| | CSR Utilization | 142.6% | 2 Current Trajectory | CSR workload is higher than advised; retention may be below optimal levels as a result |
| Product Mix | Impacted of Brokered Products (Lost Productivity) | | 2 Current Trajectory | Not Applicable |
| | AF Potential (Growth in PC Needed to Jump Scales) | | 1 Agency Financial | Not Applicable |

410

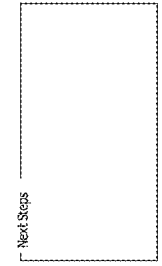

420

KEY    Agency Owner's Metrics are:
       Within expected range of the benchmark
       Moderately outside of expected range
       Significantly outside of expected range Note: Significant variances may be positive or negative. Further analysis is needed to understand the reason for the variance.

Next Steps

Agent Data Inputs

| | Current Trajectory | Marginal Adjustment | Optimal State | Proposed Action/Process |
|---|---|---|---|---|
| Staffing | | | | |
| Production | 1.2 | Make adjustments to acquisition metrics on the 3b Staff tab | 1.2 | |
| Retention | 2.3 | | 2.3 | |
| Administrative | 0.3 | | 0.3 | |
| Acquisition Funnel | | | | |
| Apps per month generated internally | 1 | | 2 | |
| Marketing Spend | $27,900 | -$9,600 | $18,300 | |
| Response Rate (Cost per Lead) | $6.84 | | $7.00 | |
| Leads Generated Externally | 4,080 | Make adjustments to acquisition metrics on the 3a Acquisition Detail tab | 2,616 | |
| Agency Generated Leads | 0 | | 0 | |
| Leads Generated Internally | 300 | | 336 | |
| Total Leads Generated Annual | 4,380 | | 2,952 | |
| Leads Utilized | 2,850 | | 2,850 | |
| Lead Utilization % | 65% | | 97% | |
| Total Producer Capacity Annual | 2,850 | | 2,850 | |
| Producer Utilizaton | 100% | | 100% | |
| Quote Ratio (Serious Quotes per Lead) | 27% | | 58% | |
| Close Ratio | 20% | | 20% | |
| Average Items per Serious Quote | 1.4 | | 1.4 | |
| Cost per Serious Quote | $36.17 | | $11.16 | |
| Items Issued | 219 | | 466 | |
| % Brokered | 0% | | 0% | |
| Agency Items | 219 | | 466 | |
| Brokered Items | 0 | | 0 | |
| | | | | |
| Current Total Monthly APA | 18 | | 39 | |
| *Proprietary apps per month** | 18 | | 39 | |
| *Brokered apps per month* | 0 | | 0 | |
| *includes apps generated internally | | | | |
| | | | | |
| Producer Lead Capacity / Month | 200 | | 200 | |
| CSR Capacity / Month (in PIF) | 191 | | 191 | |
| | | | | |
| Expenses xMarketing Expense xDebt | $128,538 | | $128,538 | |
| Existing Business | | | | |
| Tenure Retention- % 1st Year | 79.8% | | 79.8% | |
| Total Retention- Current | 89.1% | | 89.1% | |
| | | | | |
| Financing | | | | |
| Annual Payment on Note #1 | $144,000 | | $144,000 | |
| Remaining Term on Note #1 | 9 | | 9 | |
| Pre-payment Penalty | | | $0 | |
| | | | | |
| Annual Payment on Note #2 | $18,000 | | $18,000 | |
| Remaining Term on Note #2 | 3 | | 3 | |
| Pre-payment Penalty | | | $0 | |
| | | | | |
| Annual Payment on Note #3 | $0 | | $0 | |
| Remaining Term on Note #3 | 0 | | 0 | |
| Pre-payment Penalty | | | $0 | |
| | | | | |
| Compensation | | | | |
| Commission Rate (9%-11%) | 10.00% | | 10.00% | |
| Bonus as a % WP | 0.50% | | 0.50% | |

Next Steps

AGENCY BUSINESS PLANNING TOOL

CROSS REFERENCE TO RELATED APPLICATION

This application is a continuation of and claims priority to co-pending U.S. application Ser. No. 14/017,714 filed September 4, which is incorporated herein by reference in its entirety.

TECHNICAL FIELD

Aspects of the disclosure relate generally to a tool to evaluate and plan businesses. In particular, various aspects of the disclosure relate to methods and apparatuses for allowing users to view allocation of resources and helping operate at a financially optimized level.

BACKGROUND

Businesses and agencies are continuously searching for ways to operate more efficiently. Agencies, such as insurance agencies, want to maximize their resources while keeping costs low. However, these agencies lack the tools able to efficiently monitor financial data and offer areas where they may operate more efficiently. This disclosure describes various aspects of a tool to help agencies optimize their resources.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Certain aspects disclose a non-transitory computer-readable medium comprising computer-executable instructions stored thereon that when executed by a processor, cause the processor to perform steps comprising: calculating a total number of leads generated by an agency; determining a total producer capacity, wherein the determining takes into account a monthly capacity per producer and a total number of producers; analyzing the total producer capacity and the total number of leads generated to determine a total number of leads utilized; calculating a new business commission earned based on the total number of leads utilized and a plurality of conversion factors, wherein the conversion factors comprise a quote ratio, a close ratio, average items per policy, average premiums per policy and a commission rate Certain other aspects disclose a method comprising: calculating, by a processor, a total number of leads generated by an agency; determining, by the processor, a total producer capacity, wherein the determining takes into account a monthly capacity per producer and a total number of producers; analyzing, by the processor, the total producer capacity and the total number of leads generated to determine a total number of leads utilized; calculating, the processor, a new business commission earned based on the total number of leads utilized and various conversion factors, wherein the conversion factors comprise a quote ratio, a close ratio, average items per policy, average premiums per policy and a commission rate.

Further aspects of the disclosure may be provided in a computer-readable medium having computer-executable instructions that, when executed, cause a computer, user terminal, or other apparatus to at least perform one or more of the processes described herein.

The details of these and other embodiments of the disclosure are set forth in the accompanying drawings and description below. Other features and advantages of aspects of the disclosure will be apparent from the description, drawings, and claims.

BRIEF DESCRIPTION OF THE DRAWINGS

All descriptions are exemplary and explanatory only and are not intended to restrict the disclosure, as claimed. The accompanying drawings, which are incorporated in and constitute a part of this specification, illustrate embodiments of the disclosure and, together with the description, sever to explain principles of the disclosure. In the drawings:

FIG. 3a shows an illustrative embodiment of an agency background screen in accordance with aspects of the disclosure.

FIG. 3b shows an illustrative embodiment of a Key Agency Metrics screen in accordance with aspects of the disclosure.

FIG. 3c shows an illustrative embodiment of a staff tab in accordance with aspects of the disclosure.

FIG. 3d shows an illustrative embodiment of an operating expenses tab in accordance with aspects of the disclosure.

FIG. 3e shows an illustrative embodiment of an acquisition detail screen in accordance with aspects of the disclosure.

FIG. 3g shows an illustrative embodiment of benchmarking screen in accordance with aspects of the disclosure.

FIG. 4b shows an illustrative embodiment of a review screen in accordance with aspects of the disclosure.

FIG. 5 shows an illustrative embodiment of an agent data inputs screen in accordance with aspects of the disclosure.

DETAILED DESCRIPTION

In accordance with various aspects of the disclosure, methods, non-transitory computer-readable media, and apparatuses are disclosed through which an agency can view and optimize its business. In certain aspects, when a server receives data from a computing device, the server processes the data provides data related to the current status of the agency and optimization of the agency. The automated process may utilize various hardware components (e.g., processors, communication servers, memory devices, etc.) and related computer algorithms to generate image data related to the agency's business data Aspects of the disclosure may overcome problems and limitations of the prior art by providing a tool that allows an agency, i.e. an insurance agency, to track its current performance in managing existing customers and bringing in new customers. The tool may obtain information from a user or automatically from agency data regarding characteristics of the agency and agency goals. The tool may use this information to determine the agency's efficiency. In some aspects, the tool may also provide a field sales leader and an agency owner with enough information to determine how to best optimize current resources. In other aspects, the tool may benchmark an agency's performance against other similar agencies in the market.

In further aspects of the disclosure, the tool may include an acquisition funnel, which allows users, i.e. agency owners, to understand exactly how producer productivity is impacting their ability to handle the leads that the agency is generating. The acquisition funnel may allow users to see how many generated leads are being utilized. The acquisition funnel may also allow a user to see exactly how the utilized leads generate new business commission.

In certain aspects, the tool may display a roadmap to provide the user with simple and straightforward access to the various data accessible via the tool. By clicking a tab on the roadmap, users may be able to view underlying data related to the selected tab. For instance, users may be able to view an agency's assessment, identify the agency's current trajectory, how to optimize the agency's resources, and investment opportunities.

Figure 1:
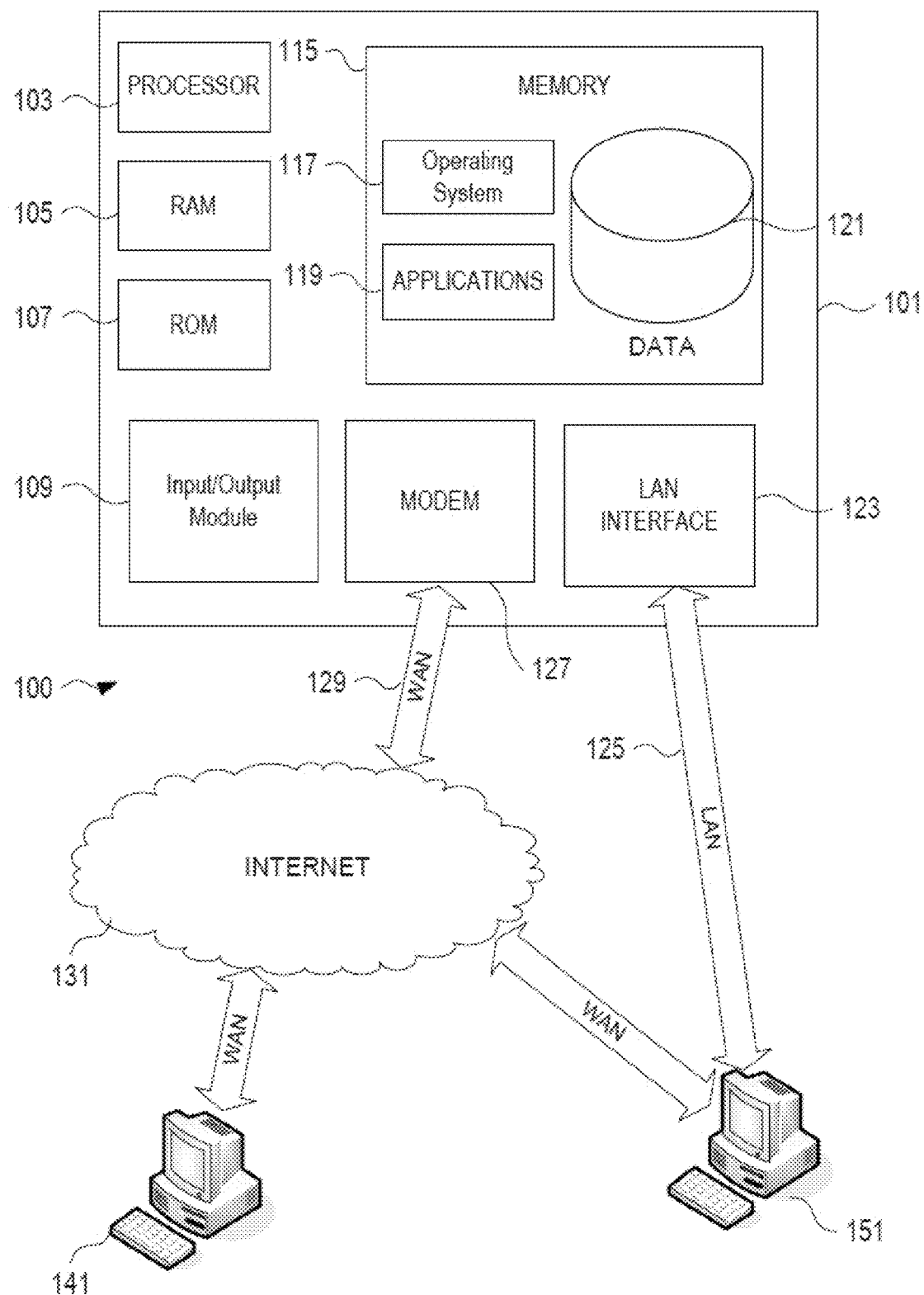
FIG. 1 shows an illustrative operating environment in which various aspects of the disclosure may be implemented.

FIG. 1 illustrates a block diagram of an enhanced claims processing server 101 (e.g. a computer server) in communication system 100 that may be used according to an illustrative embodiment of the disclosure. The server 101 may have a processor 103 for controlling overall operation of the enhanced claims processing server 101 and its associated components, including RAM 105, ROM 107, input/output module 109, and memory 115.

I/O 109 may include a microphone, keypad, touch screen, and/or stylus through which a user of server 101 may provide input, and may also include one or more of a speaker for providing audio output and a video display device for providing textual, audiovisual, and/or graphical output. Software may be stored within memory 115 to provide instructions to processor 103 for enabling device 101 to perform various functions. For example, memory 115 may store software used by the device 101, such as an operating system 117, application programs 119, and an associated database 121. Processor 103 and its associated components may allow the device 101 to run a series of computer-readable instruction to analyze an agency's business data. For example, processor 103 may determine an agency's new business commission earned from the number of total leads the agency generated.

The server 101 may operate in a networked environment supporting connections to one or more remote computers, such as terminals 141 and 151. The terminals 141 and 151 may be personal computers or servers that include many or all of the elements described above relative to the server 101. Also, terminal 141 and/or 151 may be data stores for storing image data of insured items that have been analyzed by the enhanced claims processing server 101 in the past. In yet other embodiments, terminals 141 and 151 may represent mobile devices.

The network connections depicted in FIG. 1 include a local area network (LAN) 125 and a wide area network (WAN) 129, but may also include other networks. When used in a LAN networking environment, the server 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 may be used by the server 101 according to an illustrative embodiment of the disclosure may include computer executable instructions for invoking functionality related to calculating the agency's business data.

The server 101 and/or terminals 141 or 151 may also be mobile terminals including various other components, such as a battery, speaker, camera, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including non-transitory memory storage devices, such as a hard disk, random access memory (RAM), read only memory (ROM), and memory 115. Examples of modules that may be stored in memory 115 include a lead counting module, a producer capacity module, a utilization module, and/or a commission module.

Figure 2:
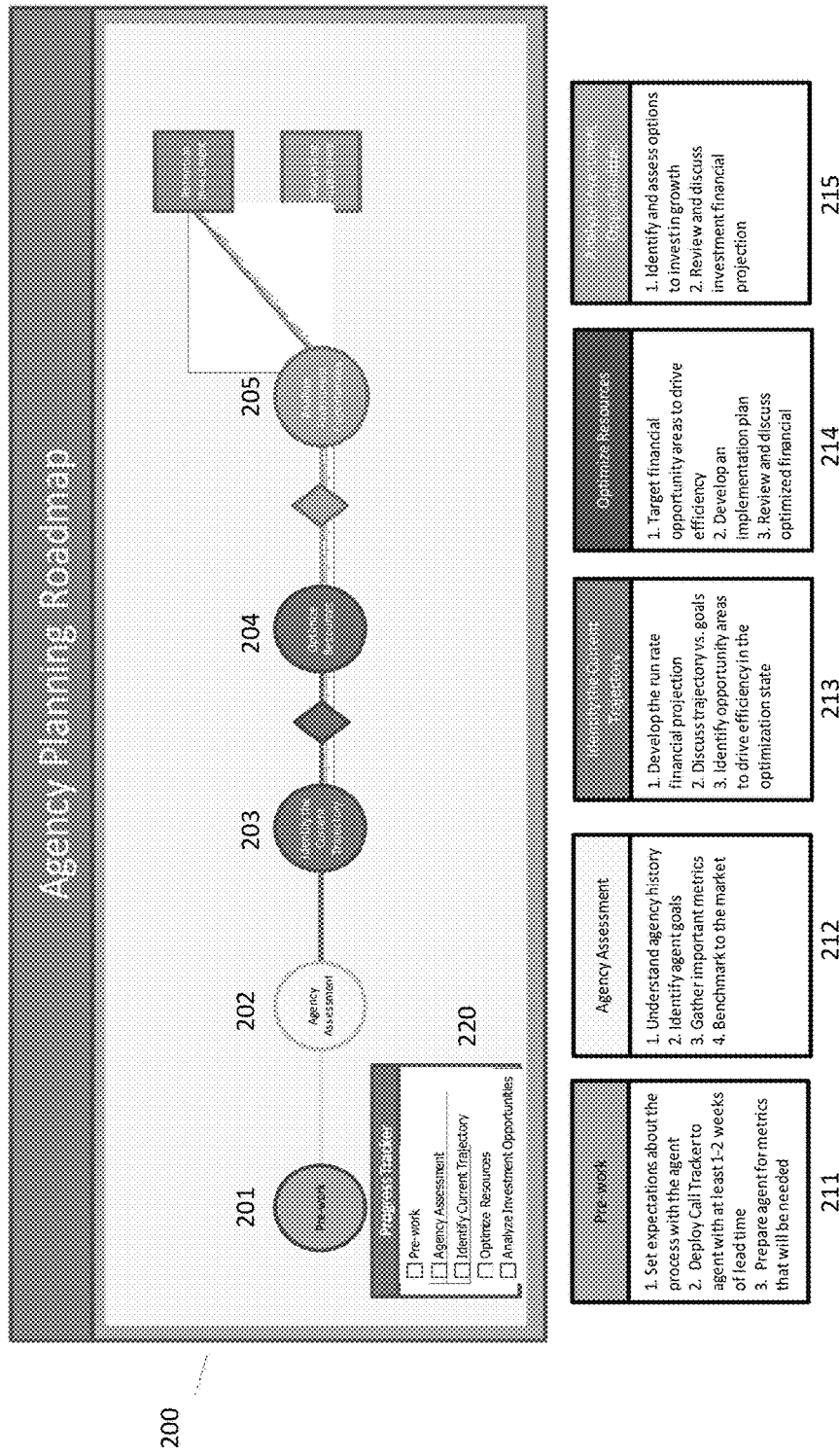
FIG. 2 shows an illustrative embodiment of an agency planning roadmap in accordance with aspects of the disclosure.

FIG. 2 shows an illustrative embodiment of an agency planning roadmap in accordance with certain aspects of the disclosure. In certain aspects, the roadmap 200 may be a part of the initial screen 250 that the user views upon launching the agency business planning tool. As shown in FIG. 2, the roadmap 200 may comprise a series of tabs (201-205). Tabs may include, for example, Pre-work 201, Agency Assessment 202, Identify the Current Trajectory 203, Optimize Resources 204, and Analyze Investment Opportunities 205. In certain embodiments, the initial screen 250 may also include a legend which provides the user with more description about each of the tabs 201-205.

In exemplary FIG. 2, the legend includes descriptions 211-215 of the tabs 201-205. For example, Pre-work description 211 provides a description of Pre-work tab 201. By reading agency assessment description 211, a user is quickly able to determine that the tasks associated with the Pre-work tab 201 include setting expectations about the process with the agent, deploying call tracker to the agent with at least 1-2 weeks of lead time, and preparing the agent for metrics that will be needed. Similarly, each of the tab descriptions 211-215 may provide a brief description of the tabs 201-205 for the user.

In certain aspects of the disclosure, the agency planning roadmap 200 may include a progress tracker 220. The progress tracker 220 may allow a user to keep track of his/her progress through the roadmap in a simplified and easy-to-use manner. In some aspects, the user may select the open form to the left of each tab title in progress tracker 220, to provide an indication that the tasks associated with the selected tab have been completed. The indication may be, for example, a check mark or an X in the previously blank form.

A user may select one of the tabs 201-205 to view the underlying data associated with the selected tab. In some embodiments, the user may select the tab by scrolling his/her mouse over the preferred tab and clicking the mouse. In certain other aspects, the user may click the preferred tab with a pointer or a finger. By selecting a tab, the agency business planning tool may display a subsequent screen with the underlying data associated with the selected tab.

As discussed above, and shown in description 211, the agency planning roadmap may begin by performing "pre-work". In some aspects, Pre-work may include providing instructions to a user, such as an agency owner, of how to use the agency business planning tool. These instructions may be provided by a specialist associated with the agency business planning tool. In certain aspects, the instructions may be provided to the user when the user receives or downloads the agency business planning tool. The Pre-work phase may instruct the user how to use the roadmap and may describe the type of information the user may need to gather and/or monitor. In some embodiments, the agency business planning tool may deploy certain features initiated by a user, such as a call tracker, which may keep a record of the calls made by agents and keep track of how leads are generated.

In certain aspects of the disclosure, once the user has completed the Pre-work phase, he/she may advance to the Agency Assessment phase by selecting tab 202. FIG. 3a shows an illustrative embodiment of an agency background screen 300 that may be displayed to the user immediately upon selecting Agency Assessment tab 202.

The agency background screen 300 may provide a series of foundational questions for the user (in this case, an agency owner) to answer to provide a background of the agency and the agency owner. As shown in exemplary FIG. 3a, there are seven initial questions provided to the user to provide the agency business planning tool with an idea of the agency and its goals. These questions may ask the agency owner, for example, "When did you become an agent at this agency?", "In what manner did you start your agency?", "How much income (gross) will it take to achieve this goal?", etc. The agency owner may provide the answer to each question in a form provided near each question. Answers for each question have been provided in the forms of FIG. 3a. The answers provided by the agency owner may, then, be stored in memory 115.

Memory 115 may also store the agency owner's responses provided in agency owner tasks box 301. Agency owner tasks box 301 may prompt the agency owner to provide a breakdown of the hours spent working on various tasks each day. After the agency owner completes the forms in agency owner tasks box 301, processor 103 may review the completed forms stored in memory 115 to calculate the agency owner's time allocation, shown in box 302. Agency owner time allocation box 302 may provide a broad breakdown of the agency owner's time allocation. In the example provided in FIG. 3a, the agency owner allocates 19% of her time to "acquisition", 25% to "retention", 0% to "administrative", and 56% to "business management". Once the agency owner has completed answering the questions provided in agency background 300, he/she may select the tab in box 303 to advance to the Key Agency Metrics screen.

FIG. 3b shows an illustrative embodiment of the Key Agency Metrics screen 310. The Key Agency Metrics screen 310 may be generated by the processor 103 using data stored in memory 115. As shown in FIG. 3b, the Key Agency Metrics screen 310 may include information regarding agent resource commitment 311, book descriptors 312, product offering 313, compensation 314, staffing 315, and expenses 316. Furthermore, the Key Agency Metrics screen 310 may include specific metrics 317, a suggested source of the metrics 318, and agent data 319. Most of the information may be provided by the agency owner, or obtained automatically by the agency business planning tool from agency business data. Information regarding agency staffing 315 may be obtained from staff tab 330, shown in FIG. 3c.

Staff tab 330 may provide an overview of the agency's total annual staffing expense. Staff tab 330 may present a series of forms to be completed regarding the names of the agency's staff, their annual wages, taxes, benefits, and costs, along with a breakdown of the percentage of time each staff member spends on certain tasks, such as production, retention, and administrative tasks. The staff tab 330 may provide an analysis of how staff members spend their time, with an assumption that each staff member is a full-time employee. In certain aspects, if an employee is not a full-time employee, the total percentage of hours spent at work may reflect hours a percentage of a full-time employee. For example, a full-time employee may be expected to work 40 hours per week; so an employee that works 20 hours per week may have their cumulative percentage of time spent working on various tasks total 50% rather than 100%.

The forms presented in staff tab 330 may be completed by the agency owner, or the staff members, or automatically by processor 103 based on saved agency business data in memory 115. Staff tab 330 also asks for the agency's location, and may automatically provide the corresponding taxes for the location entered in the agency location form. After completing and/or reviewing staff tab 330, the user may select the box 335 to return to the Key Agency Metrics screen 310.

Key Agency Metrics screen 310 may include an expenses category 316. As shown in the suggested sources column 318 of the expenses category, the suggested source of operating expenses is the operating expenses tab. By selecting the operating expenses tab, the agency owner may be shown operating expenses tab 340, as shown in FIG. 3d. The operating expenses tab 340 may include a worksheet in which the agency owner may enter non-staff expenses that are incurred to keep the agency office location open for business. These costs may include office costs, computer costs, insurance costs, professional services, company cars, and other miscellaneous expenses. In some aspects, the agency owner will be asked to enter estimates of monthly amounts spent for each operating expense. The processor 103 may then calculate total monthly operating expenses for the agency, and expand those expenses to annual operating costs for the agency. After completing and/or reviewing operating expenses tab 340, the user may select the box 345 to return to the Key Agency Metrics screen 310.

Upon completing and reviewing the Key Agency Metrics screen 310, the agency owner may select box 320 to advance to the acquisition detail screen 350, shown in FIG. 3e. The acquisition detail screen 350 provides the agency owner with an in-depth analysis of where the agency's leads are coming from, how much the agency spends on particular marketing services, and quotes generated from each type of marketing service. A lead may be considered any opportunity to speak with a potential agency customer. As shown in FIG. 3e, leads may be separated according to externally generated leads and internally generated leads. Internally generated leads may refer to leads that come from existing customer or relationships and do not cost the agency additional money to generate. Externally generated leads may refer to leads generated directly by agency marketing expenditure.

Both the externally and internally generated leads categories may have various subcategories, including source, monthly spend, leads generated, potential quotes per lead, cost per lead, quote ratio, quotes, and cost per quote. The information displayed under each subcategory may be entered by a user, automatically by the processor 103 based on agency business data stored in memory 115, information acquired by the call tracker, information provided by staff member, or any combination of those described.

The acquisition detail screen's utility may be appreciated with reference to the example shown under the externally generated leads category in FIG. 3e. In the example provided at the top of the externally generated leads category, the source is labeled "Telemarketing Svc", which may refer to the agency's marketing efforts made by telemarketing. In the provided example, the agency spends $1,000 per month on telemarketing services. The $1,000 spent on telemarketing services generated 150 external leads as seen under the leads generated subcategory. In other words, the agency's telemarketing efforts lead to 150 opportunities to speak with potential customers.

The potential quotes per lead subcategory displays 1.5 for telemarketing services. This number may be based on previous agency statistics stored in memory 115. In some aspects, the potential quotes per lead may be based on national or regional agency averages. In certain other aspects, the potential quotes per lead may be determined by the agency. For example, the agency may assign a value of 2 or 1.5 for high quality lead sources and a value of 1 for low quality lead sources. The processor 103 may determine the cost per lead, $6.67 in this example, based on the monthly spending and leads generated.

The agency owner is also able to view the quote ratio for telemarketing services. The quote ratio may refer to the percentage of leads that are converted to serious quotes. Further, serious quotes may refer to full quotes in which credit and all relevant information is run in order to provide an accurate price. As shown under the quotes subcategory, 90 quotes were generated from telemarketing services, leading to a 40% quote ratio. Finally, the processor 103 may display the cost per quote based on the monthly spending and number of quotes from telemarketing services, in this case $11.11.

Similar calculations may be performed for the various sources of externally and internally generated leads. The acquisition detail screen 350 may also display the cumulative totals of each subcategory along with a close ratio. A close ratio may be a percentage of serious quotes that are converted into policies. In some aspects, the close ratio may be the total casualty level. In some other aspects, the close ratio may be the market average close ratio.

The acquisition detail screen 350, therefore, allows a user to easily view the costs and benefits of the agency's various marketing efforts. The data presented in acquisition detail screen 350 may be passed on to the acquisition funnel, which the user may view by selecting box 355.

Figure 3F:
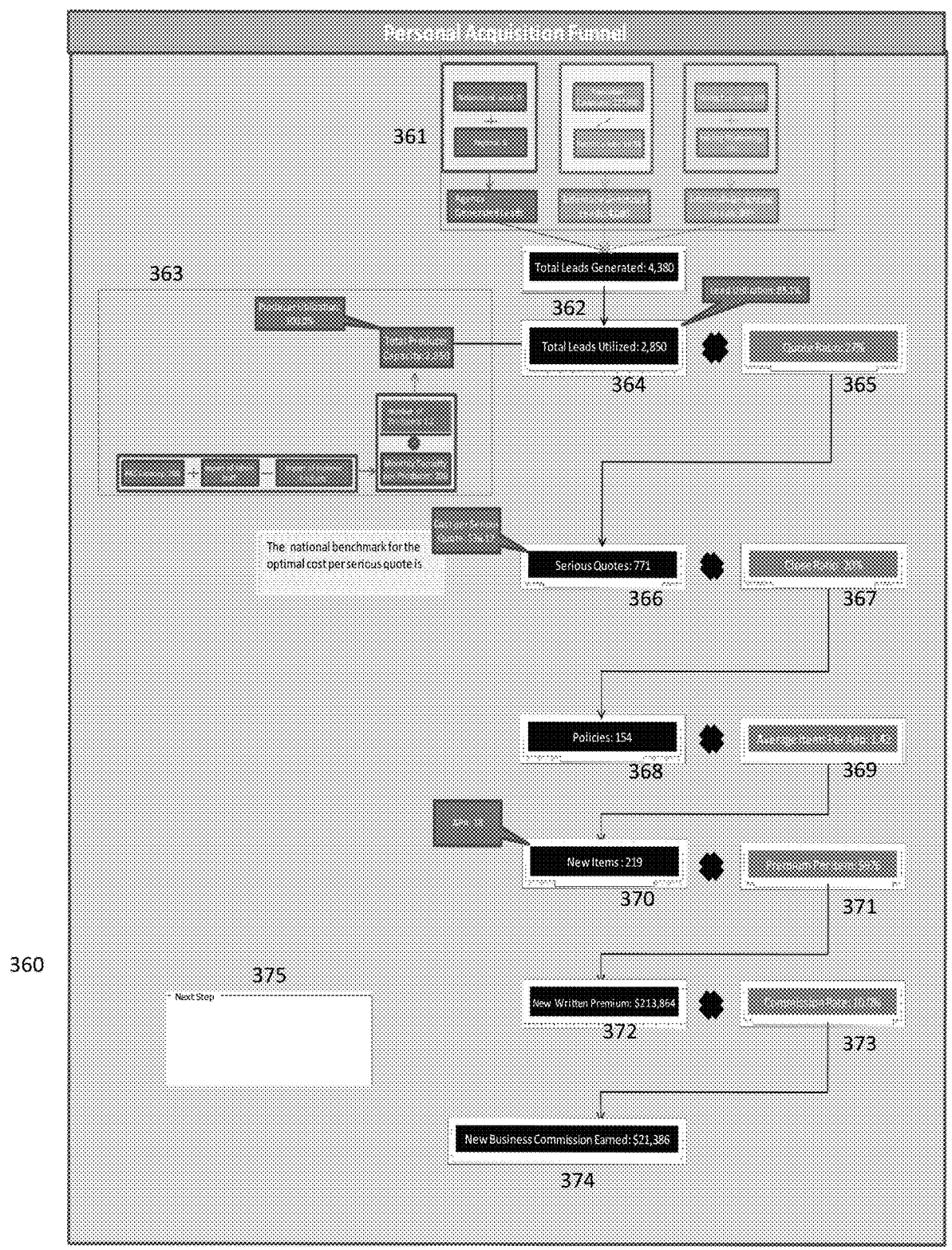
FIG. 3f shows an illustrative embodiment of an acquisition funnel screen in accordance with aspects of the disclosure.

An exemplary acquisition funnel 360 is shown in FIG. 3f. The acquisition funnel 360 may display how leads are transformed to agreements and then to income. Moreover, the acquisition funnel 360 may display how an agency's producer capacity affects its ability to generate income from leads. FIG. 3f provides an example of the acquisition funnel's 360 functionality.

First, the lead counter module calculates the generated leads in box 361. The agency generated leads in box 361 refers to leads provided at no cost by the agency's marketing department. Agency generated leads may be totaled by adding nationalized local and regional leads. In the example provided, there are 0 agency generated leads.

The lead counter module may the total externally and internally generated leads from data in acquisition detail screen 350. The lead counter module may calculate externally generated leads totals by dividing the total acquisition campaigns by the response rate. In other words, the lead counter module may divide the total cost spent on externally generated leads by the cost per lead to determine the total of externally generated leads. To determine the total amount of internally generated leads, the lead counter module may access data stored in memory 115 to add the number of existing customers to the number of existing relationships. After performing these calculations in the example shown in FIG. 3f, the lead counter module may determine that the agency has generated 0 agency leads, 4,080 external leads, and 300 internal leads. The lead counter module may, then, add those sums to calculate the total number of leads generated, as displayed in box 362. Alternatively, the steps performed by the lead counter module may be performed by processor 103.

Box 363 displays the calculations made by the producer capacity module to determine the agency's total producer capacity. The agency's total producer capacity may refer to the total amount of leads an agency can handle in a given month with all staff members working at full capacity. As shown in box 363, an agency's monthly capacity per producer is first determined by adding the P&C capacity with the impact of administrative staff and subtracting the impact of brokered products. P&C capacity may refer to producer capacity if all leads were for proprietary property and casualty products. Impact of administrative staff may refer to the productivity boost achieved through role specialization in the production process and the impact of brokered products may refer to productivity drag caused by the need to write products on an unfamiliar system. The combination of these three variables totals the monthly capacity per producer, which may refer to the number of leads a full-time producer can handle in one month. Specifically, the combination of variables totaling the monthly capacity per producer may be P&C capacity plus impact of administrative staff minus the impact of brokered products.

After calculating the monthly capacity per producer in box 363, the producer capacity module may multiply that value times the total number of producers at the agency. The number of producers may refer to the number of full-time equivalent staff members dedicated to production. The number of producers may be the total staff from the acquisition/ production segment of the staff tab plus any acquisition time the agency owner spends, determined from the agency background screen 300.

Having calculated the total leads generated by the agency and the agency's total producer capacity, the utilization module may determine the total leads utilized 364. The total leads utilized may refer to the maximum leads that an agency can pursue, given producer capacity constraints. Because the total leads generated 362 exceeds the total producer capacity 363, and because the agency cannot utilize leads beyond its capacity, the total leads utilized 364 in the provided example is equal to the total producer capacity 363.

In some aspects, the utilization module may calculate a lead utilization percentage by dividing the total leads generated 362 by the total leads utilized 364. In this example, the lead utilization percentage is 4,380/2,850, or 65.1%.

Once the utilization module has calculated the total leads utilized 364, the agency business planning tool may continue providing valuable information about the agency. The commission module may multiply the total leads utilized 364 times the quote ratio 365 to determine the number of serious quotes 366. The commission module may then multiply the number of serious quotes 366 times the close ratio 367 calculated in the acquisition detail screen 350 to determine the number of policies 368. Policies 368 may refer to a contract of insurance representing one line of insurance.

The commission module may then multiply the policies 368 times the average items per app 369 to determine the number of new items 370. The average items per app 369 may refer to the number of items associated with a typical policy. Further new items 370 may refer to a unit of exposure on a policy (i.e. three cars on an automobile policy would be three items). The commission module may multiply the new items 370 times premium per item 371 to determine the new written premium 372. Premiums per item 371 may refer to the average amount paid by customers for each insured item. The new written premium 372 may refer to the aggregate amount paid by customers for all new items.

The commission module may finally multiply the new written premium 372 times the commission rate 373 to determine the new business commission earned. The commission rate 373 may refer to the staff's commission for making a sale. The new business commission earned may refer to the total revenue generated by the agency from its generated leads. Thus the acquisition funnel 360 provides the owner with a straightforward view of how his/her agency's leads are turned into agreements and then income. Alternatively, the steps performed by the commission module may be performed by processor 103.

By selecting box 375, the agency owner may advance to the benchmarking screen 390. The benchmarking screen 390, as shown in FIG. 3g, allows an agency owner to benchmark, or compare, his/her agency to other similar sized agencies. The processor 103 may identify similar agencies based on one or more of a plurality of factors including gross revenue, number of employees, annual expenses, annual growth, etc. The data about other agencies may be provided by the other agencies and/or collected from readily available data and may be stored in memory 115.

The benchmarking screen 390 may display several graphics, including agency owner time commitment benchmarking 398, expense breakout 392, expense benchmarking 394, and deep dive 396. Agency owner time commitment benchmarking 398 allows the agency owner to benchmark his/her agency time allocation against agencies with a similar grouping as the owner's agency. Agency owner time commitment benchmarking 398 may acquire the agency owner's time allocation from agency owner time allocation 302. The agency owner may, then, select the grouping that best identifies the agency. The potential groupings may describe the agency's current state, and may include identifications such as foundational, scale, growing to scale, and maximizing scale.

In the example provided in FIG. 3g, the agency owner selected "maximizing scale", and the agency owner time commitment benchmarking 398 provides a graphical comparison of the agency with other similar agencies that are also identified as maximizing scale.

Benchmarking screen 390 may also include an expense breakout 392, which may provide agency expense data in a similar manner as the Key Agency Metrics screen 310.

Benchmarking screen 390 may, further, include expense benchmarking 394, which may provide the agency owner with a benchmarking of the agency data within expense breakout 392 against the same data of similarly situated agencies. The data benchmarked in expense benchmarking 394 may include operating expenses, acquisition expenses, retention costs, total E/R x debt, debt, and total E/R. Upon viewing the expense benchmarking 394, the agency owner may wish to view some of the data in greater detail. In some aspects, the agency owner may select the data he/she prefers to see in greater detail, and view deep dive 396.

Deep dive 396 may display an itemized view of a selected agency expense. In the example provided in FIG. 3g, the agency owner preferred to view the agency's acquisition expenses in greater detail. Deep dive 396 may provide a graphical analysis of the selected expense as compared to similar agencies. The data displayed in deep dive 396 may include variance analyses regarding the selected expenses at the agency benchmarked against the same data for similar agencies. Therefore, benchmarking screen 390 provides a user, in these examples an agency owner, with in depth comparisons of the agency with similar agencies.

At any point, the agency owner may select box 395 to return to the initial screen 250 displaying roadmap 200. Upon returning to roadmap 200, the agency owner may select tab 203 to advance to identifying the agency's current trajectory. Identifying the agency's current trajectory may call for the agency owner to develop the run rate financial projection, discuss trajectory vs. goals, and identify opportunity areas to drive efficiency in the optimization state.

Figure 4A:
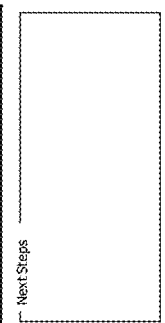
FIG. 4a shows an illustrative embodiment of a current trajectory screen in accordance with aspects of the disclosure.

Immediately upon selecting tab 203, the agency business planning tool may display the current trajectory screen 400, shown in FIG. 4a. The current trajectory screen 400 displays agency financial data and provides projections for the financial data over time. In some embodiments, the current trajectory screen 400 displays agency financial projections up to six years after the current year financial data. In some aspects, the agency's financial data is stored in memory 115. Processor 103 may calculate the agency's current trajectory based on the stored financial data and assuming no significant changes in the agency's operation from the current year. The current trajectory screen 400 may include financial information regarding policies, commission, income, expenses, etc. In some aspects, the processor 103 may calculate the data displayed in current trajectory screen 400 using data generated in acquisition detail 350 and acquisition funnel 360.

By selecting box 405, the agency owner may advance to the review screen 410, shown in FIG. 4b. The review screen 410 provides a review of the agency's current trajectory in correlation with other similar agencies. The review screen

410 may display key agency metrics, acquisition data, staffing and product mix information. The review screen may also display potential opportunity areas, agency status, tab references, and provide additional notes. The agency status information allows an agency owner to quickly where his/her agency stands as compared to other similar agencies.

The information provided in the agency status column may be color coded according to the agency owner metric 420. For example, data within an expected range of the benchmark may be green; data moderately outside of an expected range may be yellow, and data significantly outside of an expected range may be red. Therefore, an agency owner may easily be able to determine how the agency is performing and areas that need improvement. The agency owner may return to the roadmap 200 by selecting box 415.

The agency owner may advance along the roadmap 200 by selecting tab 204 to optimize resources. After selecting tab 204, the agency may be directed to the agent data inputs screen 500, shown in FIG. 5. The agent data inputs screen 500 may provide agency business information, such as staffing, the acquisition funnel, expenses, financing, and compensation. The agent data inputs screen 500 may display various statistics about the agency business information, such as current trajectory, marginal adjustment, optimal state, and proposed action/process.

The processor 103 may calculate the optimal state for each agency business information based on the goals provided by the agency owner in agency background screen 300 and/or from benchmark data from benchmarking screen 390. The current trajectory information may be obtained from current trajectory screen 400. In some aspects, based on the difference between the optimal state and current trajectory, the processor may determine the marginal adjustment required to transform agency business information to an optimal state. Further, the processor 103 and/or the agency owner may provide proposed actions or processes in agent data inputs 500 to achieve the required marginal adjustments.

The agency owner may, then, advance to acquisition detail, staff or impact of optimization screen similar to acquisition detail screen 350, staff tab 330, and current trajectory 400, respectively, by selecting the preferred tab from box 505. Upon selecting the preferred tab, a screen may be presented to the user which displays similar information as displayed in acquisition detail screen 350, staff tab 330, and current trajectory 400, with the marginal adjustment changes factored into the calculations. Therefore, an agency owner may be able to view how the marginal adjustments affect various aspects of the agency.

Figure 6A:
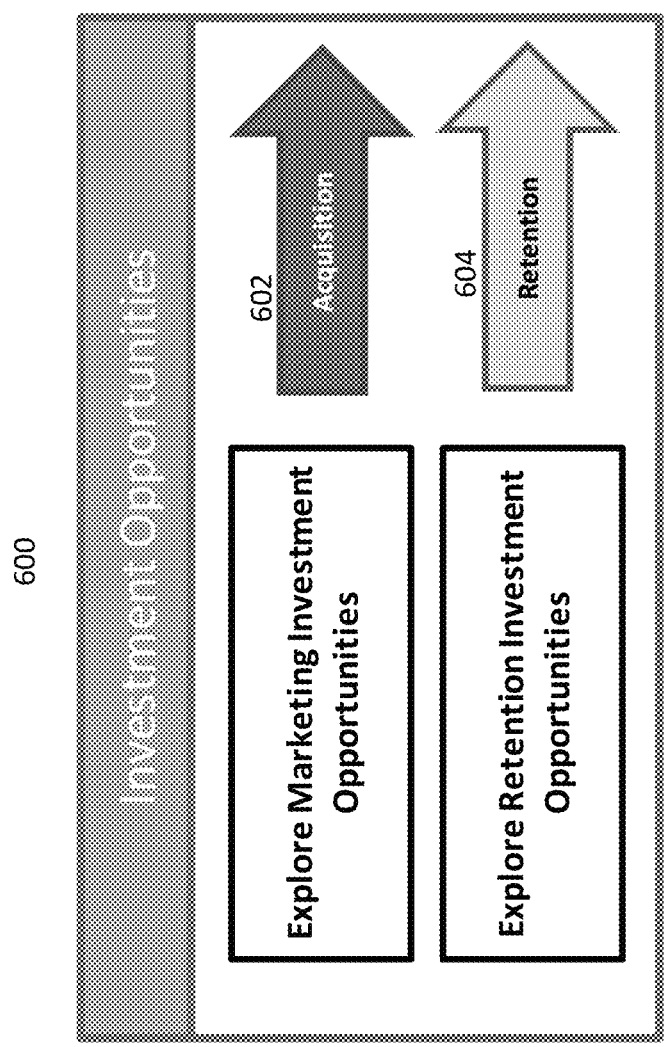
FIG. 6a shows an illustrative embodiment of an investment overview screen in accordance with aspects of the disclosure.

The agency owner may continue along the roadmap to the final tab 205. The underlying data in tab 205 may relate to analyzing agency investment opportunities. By selecting tab 205, the agency owner may be able to identify and assess options to invest in growth and review and discuss investment financial projections. Once the agency owner has selected tab 205, input/output module 109 may present investment overview screen 600, shown in FIG. 6*a*. Investment opportunities screen 600 may display options to explore marketing investment opportunities and retention opportunities. An agency owner may select the acquisition tab 602 to explore marketing investment opportunities.

Figure 6B:
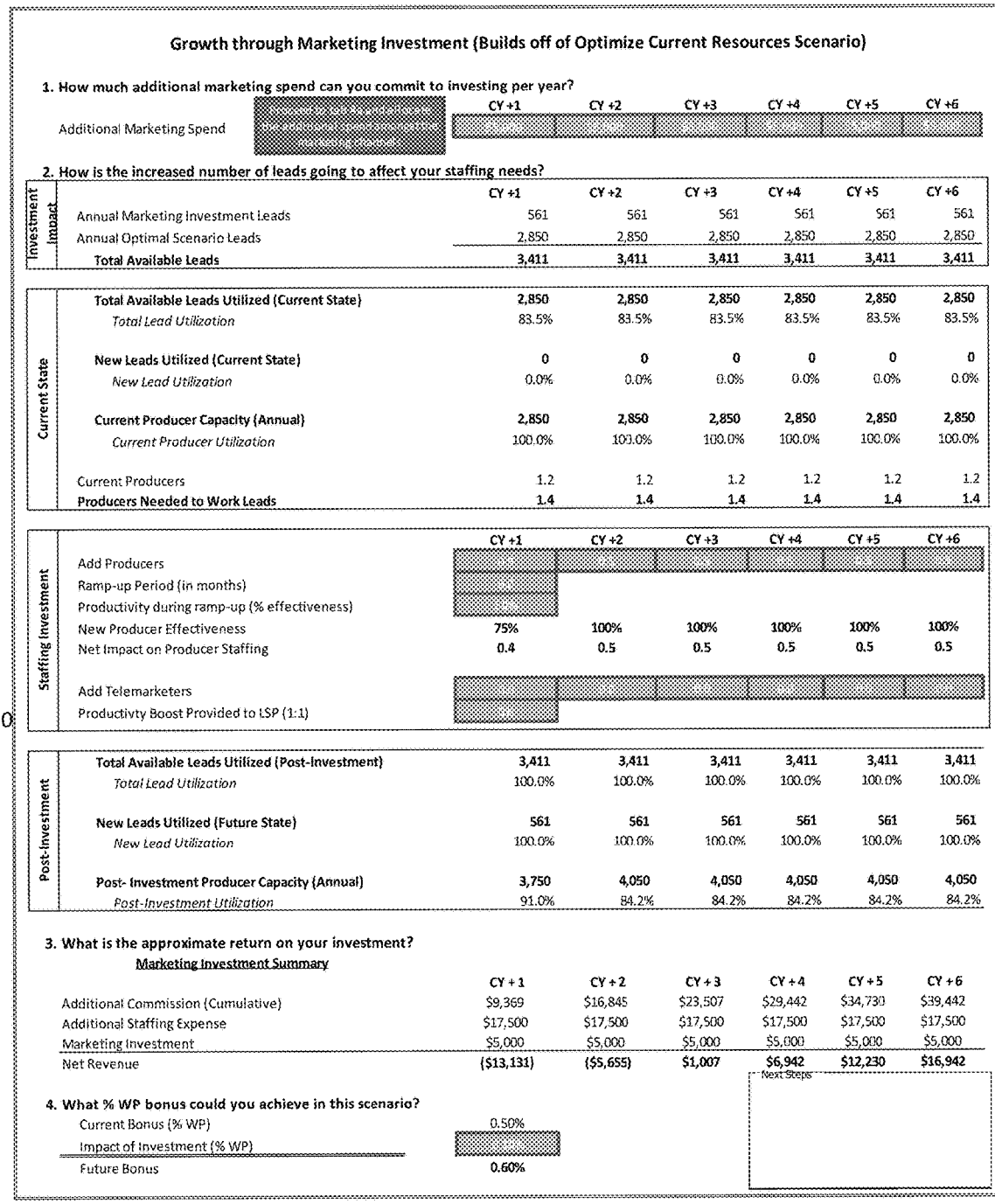
FIG. 6b shows an illustrative embodiment of a marketing investment screen in accordance with aspects of the disclosure.

Selecting acquisition tab 602 may cause the processor 103 to displaying marketing investment screen 610, shown in FIG. 6*b*. Marketing investment screen 610 may provide financial information on investment impacts, current state of the agency, staffing investment, and post-investment. The data displayed in marketing investment screen 610 may be generated by processor 103 after reviewing agency data stored in memory 115. The marketing investment screen 610 may show the effects of potential investments for a certain amount of years after the current year, for example up to 6 years after the current year.

Figure 6C:
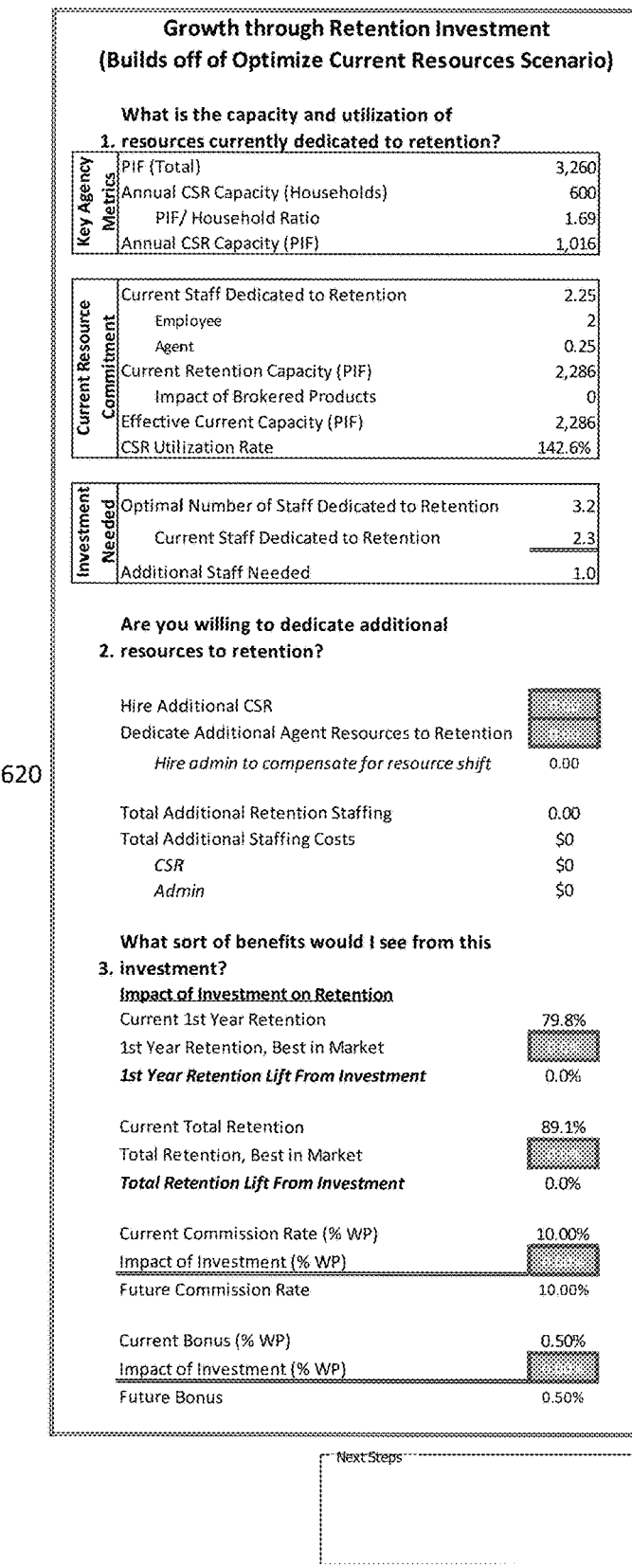
FIG. 6c shows an illustrative embodiment of a retention investment screen in accordance with aspects of the disclosure.

Alternatively, the agency owner may select retention tab 604 from investment overview 600 to view investment retention screen 620, shown in FIG. 6*c*. Retention investment screen 620 may display agency data related to key agency metrics, content resource commitment, and investment needed, along with a series of retention investment questions to be answered by the agency owner or automatically by processor 103. The agency business planning tool can use the information provided in retention investment screen 620 to display the impact of return investments to the agency owner. In some aspects, the display of the impact of return investments to the agency owner may be similar to current trajectory screen 400, with the values altered according to the proposed retention investments. A similar process may be performed for data in marketing investment screen 610. Thus the underlying data in tab 205 allows an agency to understand how he/she can maximize the significant investments the agency has already made and to search for areas to increase investment.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, the described implementation includes software by the present disclosure may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks, floppy disks, or CD-ROM.

What is claimed is:

1. A non-transitory computer-readable medium comprising computer-executable instructions stored thereon that when executed by a processor, cause the processor to perform steps comprising:
   generating an electronic, interactive roadmap interface comprising a plurality of separately-selectable sub-interfaces, each of the sub-interfaces corresponding to a different part of an agency planning process;
   receiving a selection of a first sub-interface of the selectable sub-interfaces;
   in response to the selection of the first sub-interface, generating a first user input display comprising at least one field;
   modifying at least one field in a second user input display different from the first user input display, based on input into the at least one field of the first user input display; and
   determining a plurality of agency planning attributes based on the input in the at least one field of the first user input display, the determining including:
   (a) calculating a total number of leads generated by an agency based on user input received in one or more interactive fields of a second sub-interface; and
   (b) determining a maximum number of leads, of the total number of leads generated, the agency is able to pursue by:
   comparing the total number of leads generated to a total producer capacity, wherein the total producer capacity is based on the input in the at least one field of the first user input display;

responsive to determining that the total number of leads generated is greater than the total producer capacity, determining the maximum number of leads to be the total producer capacity; and responsive to determining that the total number of leads is not greater than the total producer capacity, determining the maximum number of leads to be the total number of leads generated by the agency; and displaying a new business commission in at least one other field of the second user input display, the new business commission indicating a commission earned based on the maximum number of leads and a plurality of conversion factors, wherein the plurality of conversion factors comprise one of or more of: a quote ratio, a close ratio, average items per policy, average premiums per policy and a commission rate.

2. The non-transitory computer-readable medium of claim 1, wherein the total number of leads generated by the agency comprises externally generated leads and internally generated leads.

3. The non-transitory computer-readable medium of claim 1, further comprising computer-executable instructions that when executed by the processor, cause the processor to further perform steps comprising: multiplying the maximum number of leads the agency is able to pursue times the quote ratio to determine the number of serious quotes; then multiplying the number of serious quotes times the close ratio to determine a number of policies; then multiplying the number of policies times the average items per policy to determine a number of new items; then multiplying the number of new items times the premium per item to determine a new written premium; and then multiplying the new written premium times the commission rate to determine the new business commission earned.

4. The non-transitory computer-readable medium of claim 1, further comprising computer-executable instructions that when executed by the processor, cause the processor to further perform steps comprising: benchmarking agency data against other similar agencies.

5. The non-transitory computer-readable medium of claim 1, further comprising computer-executable instructions that when executed by the processor, cause the processor to further perform steps comprising: displaying a progress tracker configured to track completion of each of the plurality of separately-selectable sub-interfaces.

6. The non-transitory computer-readable medium of claim 1, further comprising computer-executable instructions that when executed by the processor, cause the processor to further perform steps comprising: providing questions about the agency regarding agent resource commitment, book descriptors, product offering, compensation, staffing, expenses, agency owner tasks, and wages, wherein answers to the questions may be provided by a user or obtained automatically from agency data.

7. The non-transitory computer-readable medium of claim 1, further comprising computer-executable instructions that when executed by the processor, cause the processor to further perform steps comprising: optimizing resources by displaying how changes in certain aspects of the agency's business development affects other aspects of the agency's business development.

8. An apparatus comprising:

a processor; and memory storing computer-executable instructions that when executed, cause the processor to perform steps comprising:

generating an electronic, interactive roadmap interface comprising a plurality of separately-selectable sub-interfaces, each of the sub-interfaces corresponding to a different part of an agency planning process;

receiving a selection of a first sub-interface of the selectable sub-interfaces;

in response to the selection of the first sub-interface, generating a first user input display comprising at least one field;

modifying at least one field in a second user input display different from the first user input display, based on input into the at least one field of the first user input display; and determining a plurality of agency planning attributes based on the input in the at least one field of the first user input display, the determining including:

(a) calculating a total number of leads generated by an agency based on user input received in one or more interactive fields of a second sub-interface; and (b) determining a maximum number of leads, of the total number of leads generated, the agency is able to pursue by:

comparing the total number of leads generated to a total producer capacity, wherein the total producer capacity is based on the input in the at least one field of the first user input display;

responsive to determining that the total number of leads generated is greater than the total producer capacity, determining the maximum number of leads to be the total producer capacity; and responsive to determining that the total number of leads is not greater than the total producer capacity, determining the maximum number of leads to be the total number of leads generated by the agency; and displaying a new business commission in at least one other field of the second user input display, the new business commission indicating a commission earned based on the maximum number of leads and a plurality of conversion factors, wherein the plurality of conversion factors comprise one of or more of: a quote ratio, a close ratio, average items per policy, average premiums per policy and a commission rate.

9. The apparatus of claim 8, wherein the total number of leads generated by the agency comprises externally generated leads and internally generated leads.

10. The apparatus of claim 8, further comprising computer-executable instructions that when executed by the processor, cause the processor to further perform steps comprising: multiplying the maximum number of leads the agency is able to pursue times the quote ratio to determine the number of serious quotes; then multiplying the number of serious quotes times the close ratio to determine a number of policies; then multiplying the number of policies times the average items per policy to determine a number of new items; then multiplying the number of new items times the premium per item to determine a new written premium; and then multiplying the new written premium times the commission rate to determine the new business commission earned.

11. The apparatus of claim 8, further comprising computer-executable instructions that when executed by the processor, cause the processor to further perform steps comprising: benchmarking agency data against other similar agencies.

12. The apparatus of claim 8, further comprising computer-executable instructions that when executed by the processor, cause the processor to further perform steps comprising: displaying a progress tracker configured to track completion of each of the plurality of separately-selectable sub-interfaces.

13. The apparatus of claim 8, further comprising computer-executable instructions that when executed by the processor, cause the processor to further perform steps comprising: providing questions about the agency regarding agent resource commitment, book descriptors, product offering, compensation, staffing, expenses, agency owner tasks, and wages, wherein answers to the questions may be provided by a user or obtained automatically from agency data.

14. The apparatus of claim 8, further comprising computer-executable instructions that when executed by the processor, cause the processor to further perform steps comprising: optimizing resources by displaying how changes in certain aspects of the agency's business development affects other aspects of the agency's business development.

15. A method comprising:
generating an electronic, interactive roadmap interface comprising a plurality of separately-selectable sub-interfaces, each of the sub-interfaces corresponding to a different part of an agency planning process;
receiving a selection of a first sub-interface of the selectable sub-interfaces;
in response to the selection of the first sub-interface, generating a first user input display comprising at least one field;
modifying at least one field in a second user input display different from the first user input display, based on input into the at least one field of the first user input display; and
determining a plurality of agency planning attributes based on the input in the at least one field of the first user input display, the determining including:
(a) calculating a total number of leads generated by an agency based on user input received in one or more interactive fields of a second sub-interface; and
(b) determining a maximum number of leads, of the total number of leads generated, the agency is able to pursue by:
comparing the total number of leads generated to a total producer capacity, wherein the total producer capacity is based on the input in the at least one field of the first user input display;
responsive to determining that the total number of leads generated is greater than the total producer capacity, determining the maximum number of leads to be the total producer capacity; and
responsive to determining that the total number of leads is not greater than the total producer capacity, determining the maximum number of leads to be the total number of leads generated by the agency; and
displaying a new business commission in at least one other field of the second user input display, the new business commission indicating a commission earned based on the maximum number of leads and a plurality of conversion factors, wherein the plurality of conversion factors comprise one of or more of: a quote ratio, a close ratio, average items per policy, average premiums per policy and a commission rate.

16. The method of claim 15, wherein the total number of leads generated by the agency comprises externally generated leads and internally generated leads.

17. The method of claim 15, further comprising: multiplying the maximum number of leads the agency is able to pursue times the quote ratio to determine the number of serious quotes; then multiplying the number of serious quotes times the close ratio to determine a number of policies; then multiplying the number of policies times the average items per policy to determine a number of new items; then multiplying the number of new items times the premium per item to determine a new written premium; and then multiplying the new written premium times the commission rate to determine the new business commission earned.

18. The method of claim 15, further comprising benchmarking agency data against other similar agencies.

19. The method of claim 15, further comprising: displaying a progress tracker configured to track completion of each of the plurality of separately-selectable sub-interfaces.

20. The method of claim 15, further comprising providing questions about the agency regarding agent resource commitment, book descriptors, product offering, compensation, staffing, expenses, agency owner tasks, and wages, wherein answers to the questions may be provided by a user or obtained automatically from agency data.

* * * * *